United States Patent
Grosset et al.

(10) Patent No.: US 10,002,126 B2
(45) Date of Patent: *Jun. 19, 2018

(54) BUSINESS INTELLIGENCE DATA MODELS WITH CONCEPT IDENTIFICATION USING LANGUAGE-SPECIFIC CLUES

(71) Applicant: International Business Machines Corporation, Armonk, NY (US)

(72) Inventors: Robin N. Grosset, Ottawa (CA); Mohsen Rais-Ghasem, Ottawa (CA); Graham A. Watts, Ottawa (CA); Qing Wei, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 343 days.

This patent is subject to a terminal disclaimer.

(21) Appl. No.: 14/489,251

(22) Filed: Sep. 17, 2014

(65) Prior Publication Data

US 2015/0006160 A1 Jan. 1, 2015

Related U.S. Application Data

(63) Continuation of application No. 13/844,587, filed on Mar. 15, 2013.

(51) Int. Cl.
*G06F 17/27* (2006.01)
*G06F 17/30* (2006.01)
*G06F 17/28* (2006.01)

(52) U.S. Cl.
CPC ...... *G06F 17/2745* (2013.01); *G06F 17/2785* (2013.01); *G06F 17/28* (2013.01); *G06F 17/30707* (2013.01)

(58) Field of Classification Search
CPC ......... G06F 17/30643; G06F 17/30705; G06F 17/30707; G06F 17/3061; G06F 17/3071; G06F 17/275

(Continued)

(56) References Cited

U.S. PATENT DOCUMENTS 5,550,964 A  8/1996  Davoust
5,842,213 A  11/1998  Odom et al.

(Continued)

FOREIGN PATENT DOCUMENTS

EP  2073131 A1  6/2009
WO  0046701 A1  8/2000

(Continued)

OTHER PUBLICATIONS

"Automated Ontological Mapping for Metadata," IP.com Prior Art Database Technical Disclosure: IPCOM000191276D, Dec. 24, 2009, 2 pp.

(Continued)

*Primary Examiner* — Huyen Vo
(74) *Attorney, Agent, or Firm* — Shumaker & Sieffert, P.A.

(57) ABSTRACT

Techniques are described for modeling information from a data source. In one example, a method for modeling information from a data source includes comparing, with one or more computing devices, a data item heading from the data source with concept keywords in a concept library, the concept library comprising a plurality of concepts and one or more of the concept keywords in at least one language associated with each of one or more of the concepts. The method further includes identifying, with one or more computing devices, one or more matches between the data item heading and one or more concept keywords associated with a particular concept from among the concepts comprised in the concept library. The method further includes identifying, with one or more computing devices, the data item heading as being associated with the particular concept.

14 Claims, 6 Drawing Sheets

(58) Field of Classification Search
USPC .................. 704/1–10, 230–257, 270, 270.1
See application file for complete search history.

(56) References Cited

U.S. PATENT DOCUMENTS

| | | | |
|---|---|---|---|
| 6,052,656 A | 4/2000 | Suda et al. | |
| 6,108,004 A | 8/2000 | Medl | |
| 6,199,034 B1 | 3/2001 | Wical | |
| 6,289,500 B1 | 9/2001 | Baxter et al. | |
| 6,424,973 B1 | 7/2002 | Baclawski | |
| 7,499,944 B2 | 3/2009 | Higuchi | |
| 7,502,779 B2 | 3/2009 | Brockway et al. | |
| 7,562,074 B2 | 7/2009 | Liddell et al. | |
| 7,734,659 B2 | 6/2010 | Lori | |
| 7,739,104 B2 | 6/2010 | Berkan et al. | |
| 7,774,288 B2 | 8/2010 | Acharya et al. | |
| 7,899,810 B2 | 3/2011 | Cambot et al. | |
| 8,019,758 B2 | 9/2011 | Zheng et al. | |
| 8,150,832 B2 | 4/2012 | Helfman | |
| 8,175,911 B2 | 5/2012 | Cao et al. | |
| 8,239,342 B2 | 8/2012 | Ross et al. | |
| 8,266,148 B2 | 9/2012 | Guha et al. | |
| 8,332,440 B2 | 12/2012 | Parker, III et al. | |
| 8,452,804 B2 | 5/2013 | Bakalash et al. | |
| 8,645,362 B1 | 2/2014 | Jain et al. | |
| 8,849,843 B1 | 9/2014 | George et al. | |
| 8,977,953 B1 | 3/2015 | Pierre et al. | |
| 8,996,555 B2 | 3/2015 | Kuchmann-Beauger et al. | |
| 9,064,006 B2 | 6/2015 | Hakkani-Tur et al. | |
| 2002/0016800 A1* | 2/2002 | Spivak | G06F 17/30707 715/249 |
| 2003/0028541 A1 | 2/2003 | Bradley et al. | |
| 2003/0088543 A1 | 5/2003 | Skeen et al. | |
| 2003/0126147 A1 | 7/2003 | Essafi et al. | |
| 2003/0221171 A1* | 11/2003 | Rust | G06F 17/21 715/236 |
| 2004/0024739 A1 | 2/2004 | Copperman et al. | |
| 2005/0043940 A1 | 2/2005 | Elder | |
| 2005/0278321 A1 | 12/2005 | Vailaya et al. | |
| 2006/0024654 A1 | 2/2006 | Goodkovsky | |
| 2006/0074980 A1 | 4/2006 | Sarkar | |
| 2006/0106824 A1 | 5/2006 | Stuhec | |
| 2006/0117002 A1 | 6/2006 | Swen | |
| 2006/0179074 A1 | 8/2006 | Martin et al. | |
| 2006/0288038 A1 | 12/2006 | Zheng et al. | |
| 2007/0078889 A1 | 4/2007 | Hoskinson | |
| 2007/0088723 A1 | 4/2007 | Fish | |
| 2007/0094060 A1 | 4/2007 | Apps | |
| 2007/0118551 A1 | 5/2007 | Akkiraju et al. | |
| 2007/0174188 A1 | 7/2007 | Fish | |
| 2008/0016039 A1 | 1/2008 | Brown et al. | |
| 2008/0168135 A1 | 1/2008 | Redlich et al. | |
| 2008/0059498 A1 | 3/2008 | Carus et al. | |
| 2008/0097979 A1 | 4/2008 | Heidloff et al. | |
| 2008/0189312 A1 | 8/2008 | Taranov et al. | |
| 2008/0195604 A1 | 8/2008 | Sears | |
| 2008/0270380 A1 | 10/2008 | Ohrn et al. | |
| 2009/0125463 A1 | 5/2009 | Hido | |
| 2009/0172035 A1 | 7/2009 | Lessing et al. | |
| 2009/0222476 A1 | 9/2009 | Williamson | |
| 2009/0254847 A1 | 10/2009 | Counts et al. | |
| 2009/0265297 A1 | 10/2009 | Misra et al. | |
| 2009/0319544 A1 | 12/2009 | Griffin et al. | |
| 2009/0327240 A1 | 12/2009 | Meehan et al. | |
| 2010/0049692 A1 | 2/2010 | Astito et al. | |
| 2010/0049766 A1 | 2/2010 | Sweeney et al. | |
| 2010/0082691 A1 | 4/2010 | Jaster et al. | |
| 2010/0199223 A1 | 8/2010 | Colner | |
| 2010/0202698 A1 | 8/2010 | Schmidtler et al. | |
| 2010/0287014 A1 | 11/2010 | Gaulin et al. | |
| 2010/0325206 A1 | 12/2010 | Dayal et al. | |
| 2011/0040552 A1 | 2/2011 | Van Guilder et al. | |
| 2011/0072021 A1 | 3/2011 | Lu et al. | |
| 2011/0087629 A1 | 4/2011 | B'Far et al. | |
| 2011/0093469 A1 | 4/2011 | B'Far et al. | |
| 2011/0138312 A1 | 6/2011 | Yeh et al. | |
| 2011/0153611 A1 | 6/2011 | Ankisettipalli et al. | |
| 2011/0258202 A1 | 10/2011 | Mukherjee et al. | |
| 2011/0307485 A1 | 12/2011 | Udupa et al. | |
| 2011/0320396 A1 | 12/2011 | Hunt et al. | |
| 2012/0078926 A1 | 3/2012 | Chu-Carroll et al. | |
| 2012/0089636 A1 | 4/2012 | Qayyum et al. | |
| 2012/0102032 A1 | 4/2012 | Bryne et al. | |
| 2012/0143780 A1 | 6/2012 | Adendorff et al. | |
| 2012/0154402 A1 | 6/2012 | Mital et al. | |
| 2012/0179710 A1 | 7/2012 | Hanai | |
| 2012/0197936 A1 | 8/2012 | Fuchs | |
| 2012/0290561 A1 | 11/2012 | Kobayashi et al. | |
| 2012/0310628 A1* | 12/2012 | Rathod | G06F 17/3082 704/9 |
| 2013/0117253 A1 | 5/2013 | Wang et al. | |
| 2013/0132365 A1 | 5/2013 | Chang et al. | |
| 2013/0173507 A1 | 7/2013 | Chmiel et al. | |
| 2013/0205190 A1 | 8/2013 | Kossman et al. | |
| 2013/0246430 A1 | 9/2013 | Szucs et al. | |
| 2013/0268554 A1* | 10/2013 | Kokubu | G06F 17/30477 707/769 |
| 2013/0300743 A1 | 11/2013 | Degrell et al. | |
| 2014/0095145 A1 | 4/2014 | Assulin et al. | |
| 2014/0114902 A1 | 4/2014 | McClung et al. | |
| 2014/0164362 A1 | 6/2014 | Syed et al. | |
| 2014/0164379 A1 | 6/2014 | Jojgov et al. | |
| 2014/0278364 A1 | 9/2014 | Grosset et al. | |
| 2014/0279677 A1 | 9/2014 | Grosset et al. | |
| 2014/0379755 A1 | 12/2014 | Kuriakose et al. | |
| 2015/0006160 A1 | 1/2015 | Grosset et al. | |
| 2015/0006432 A1 | 1/2015 | Grosset et al. | |
| 2015/0032707 A1 | 1/2015 | Barykin et al. | |
| 2015/0066945 A1 | 3/2015 | Crowe | |
| 2015/0186776 A1 | 7/2015 | Petitclerc et al. | |
| 2015/0186808 A1 | 7/2015 | Petitclerc et al. | |
| 2015/0278198 A1 | 10/2015 | Andreev | |
| 2015/0317374 A1 | 11/2015 | Petitclerc et al. | |
| 2015/0317573 A1 | 11/2015 | Petitclerc et al. | |
| 2015/0339369 A1 | 11/2015 | Rais-Ghasem et al. | |

FOREIGN PATENT DOCUMENTS

| | | |
|---|---|---|
| WO | 2007005378 A2 | 1/2007 |
| WO | 2008100849 A2 | 8/2008 |
| WO | 2009094290 A2 | 7/2009 |
| WO | 2012085518 A1 | 6/2012 |

OTHER PUBLICATIONS

"Method and System for Dynamically Creating Business Intelligence Reports and Dashboards based on User Inputs," IP.com Prior Art Database Technical Disclosure: IPCOM000202424D, Dec. 15, 2010, 6 pp.

"Method for Determining Explanatory Factors for a Selection of Aggregated Data," IP.com Prior Art Technical Database Disclosure: IPCOM000225183D. Jan. 29, 2013, 6 pp.

"Method and System for Automatically Determining Hierarchies/Relationships from a Data Set for Generating Data Model," IP.com Prior Art Database Technical Disclosure: IPCOM000202401D, Dec. 15, 2010, 5 pp.

Cao et al., "Ontology-based Integration of Business Intelligence," Web Intelligence and Agent Systems, retrieved from http://www-staff.it.uts.edu.au/~lbcao/publication/W639.pdf, Dec. 6, 2006, 13 pp.

Cheng et al., "An Ontology-Based Business Intelligence Application in a Financial Knowledge Management System," Expert Systems with Applications, Elsevier Ltd., Mar. 4, 2008, 9 pp.

Egozi et al., "Concept-Based Information Retrieval using Explicit Semantic Analysis," ACM Transactions on Information Systems, vol. 29, No. 2, Apr. 2011, 38 pp.

Hofmann, "Latent Semantic Models for Collaborative Filtering," ACM Transactions on Information Systems, vol. 22, No. 1, Jan. 1, 2004, 27 pp.

Kishore et al., "Probabilistic Semantic Web Mining Using Artificial Neural Analysis," International Journal of Computer Science and Information Security, vol. 7, No. 3, Mar. 2010, 11 pp.

(56) References Cited

OTHER PUBLICATIONS

Mustapha et al., "Knowledge Harvesting for Business Intelligence," Second European Business Intelligence Summer School (eBISS 2012), Jul. 15-21, 2012, 144 pp.
Neumayr et al., "Semantic Cockpit: An Ontology-driven. Interactive BI Tool for Comparative Data Analysis," The 1st International Workshop on Modeling and Reasoning for Business Intelligence (MoRe-BI 2011), Oct. 31, 2011, 20 pp.
Rais-Ghasem et al., "Towards Semantic Data Analysis," CASCON 2013, Nov. 18-20, 2013, 12 pp.
Rais-Ghasem et al., "Towards Semantic Data Analysis," IBM Canada Ltd., Nov. 18-20, 2013, 8 pp.
Saggion et al., "Ontology-based Information Extraction for Business Intelligence," Proceedings of the 6th International Semantic Web Conference, ISWC'07/ASWC'07, Nov. 11, 2007, 14 pp.
Sell et al., "SBI: A Semantic Framework to Support Business Intelligence," OBI'08, Oct. 2008, 11 pp.
Van Ham et al., "Guiding Multidimensional Analysis Using Decision Trees," IBM Canada Ltd., Proceedings of the 2013 Conference of the Center for Advanced Studies on Collaborative Research, Nov. 18, 2013, 15 pp.
Zarandi, "A Retail Ontology: Formal Semantics and Efficient Implementation," University of Toronto, Master of Science Thesis, 2007, 180 pp.
U.S. Appl. No. 13/844,587, by Robin N. Grosset et al., filed Mar. 15, 2013.
U.S. Appl. No. 13/844,612, by Robin N. Grosset et al., filed Mar. 15, 2013.
U.S. Appl. No. 14/266,497, by Martin Petitclerc et al., filed Apr. 30, 2014.
U.S. Appl. No. 14/285,269, by Mohsen M. Rais-Ghasem et al., filed May 22, 2014.
U.S. Appl. No. 14/141,950, by Martin Petitclerc et al., filed Dec. 27, 2013.
U.S. Appl. No. 14/309,408, by Martin Petitclerc et al., filed Jun. 19, 2014.
"The Chado Approach," Chapter 1. Introduction, retrieved from http://papio.biology.duke.edu/babase_chado_html/the-chado-approach.html on Jan. 8, 2015, 1 pp.
Han et al., "RDF123: a mechanism to transform spreadsheets to RDF," UMBC ebiquity, Aug. 26, 2007, 19 pp.
Syed et al., "Exploiting a Web of Semantic Data for Interpreting Tables," UMBC ebiquity, Second Web Science Conference, Apr. 26-27, 2010, 8 pp.
Office Action from U.S. Appl. No. 13/844,587, dated Feb. 1, 2016, 26 pp.
Fileto et al., "Baquara: A Holistic Ontological Framework for Movement Analysis using Linked Data," adfa, 2011. Springer-Verlag Berlin Heidelberg 2011, pp. 1-14.
U.S. Appl. No. 14/839,701, by Mohsen Rais Ghasem et al., filed Aug. 28, 2015.
Office Action from U.S. Appl. No. 13/844,587, dated Mar. 27, 2015, 17 pp.
Final Office Action from U.S. Appl. No. 13/844,587, dated Jun. 13, 2016, 26 pp.
Response to Office Action dated Mar. 27, 2015, from U.S. Appl. No. 13/844,587, filed Jun. 26, 2015, 11 pp.
Response to the Final Office Action dated Jun. 13, 2016, from U.S. Appl. No. 13/844,587, filed Aug. 29, 2016, 7 pp.
Advisory Action from U.S. Appl. No. 13/844,587, dated Sep. 6, 2016, 5 pp.
Response to the Final Office Action dated Jun. 13, 2016 and the Advisory Action dated Sep. 6, 2016, from U.S. Appl. No. 13/844,587, filed Sep. 9, 2016, 15 pp.
Office Action from U.S. Appl. No. 13/844,587, dated Oct. 1, 2015, 24 pp.
Fei Li et al., "Constructing an Interactive Natural Language Interface for Relational Databases," Proceedings of the VLDB Endowment, vol. 8, No. 1, Sep. 1, 2014, 12 pp.
Rukshan Alexander et al., "Natural Language Web Interface for Database (NLWIDB)," Proceedings of the Third International Symposium, SEUSL: Jul. 6-7, 2013, 8 pp.
U.S. Appl. No. 14/610,812, filed Jan. 30, 2015 by Mohsen Rais-Ghasem et al.
U.S. Appl. No. 15/055,382, filed Feb. 26, 2016 by Mohsen Rais-Ghasem et al.
Preliminary Amendment from U.S. Appl. No. 14/610,812, filed Feb. 19, 2016 5 pgs.
Non-Final Office Action from U.S. Appl. No. 13/844,587, dated Nov. 16, 2016 28 pgs.
Response to Non-Final Office Action from U.S. Appl. No. 13/844,587, dated Nov. 16, 2016, filed Feb. 16, 2017 14 pgs.
Final Office Action from U.S. Appl. No. 13/844,587, dated Mar. 10, 2017 27 pgs.
Response to Office Action dated Mar. 10, 2017, from U.S. Appl. No. 13/844,587, filed Jun. 9, 2017, 13 pp.
Amendment in Response to Office Action dated Mar. 10, 2017, from U.S. Appl. No. 13/844,587, filed Jun. 9, 2017, 9 pp.
Office Action from U.S. Appl. No. 13/844,587, dated Nov. 2, 2017, 32 pp.
Amendment in Response to Office Action dated Nov. 2, 2017, from U.S. Appl. No. 13/844,587, filed Feb. 1, 2018, 12 pp.

* cited by examiner

BUSINESS INTELLIGENCE DATA MODELS WITH CONCEPT IDENTIFICATION USING LANGUAGE-SPECIFIC CLUES

This application is a Continuation of U.S. application Ser. No. 13/844,587, filed Mar. 15, 2013 entitled BUSINESS INTELLIGENCE DATA MODELS WITH CONCEPT IDENTIFICATION USING LANGUAGE-SPECIFIC CLUES, the entire content of which is incorporated herein by reference.

TECHNICAL FIELD

The invention relates to business intelligence systems, and more particularly, to data models for business intelligence systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may be used to provide insights into such collections of enterprise data. A BI system may use a manually created metadata model to organize and describe large bodies of enterprise data to support useful business intelligence tools. A metadata model may contain descriptions of the structure and context of the data, and support queries of the data with the BI system. Typically, a BI system may use a metadata model that may be created manually by a data modeler to describe the data. The metadata model may contain descriptions of the structure and nature of the data, such as portions of the data that are categories and portions of the data that are numeric metrics, for example. Such descriptions of the data may provide enough context to the BI system to allow it to create useful queries. BI systems also now typically incorporate data from various unmodeled collections of data, such as spreadsheets and comma-separated values (CSV) files.

SUMMARY

In general, examples disclosed herein are directed to techniques for identifying data with concepts, in both modeled and unmodeled data collections, and in any of various languages that may all be represented in one enterprise data collection. Identifying concepts in the data may facilitate new modes of description and analysis of the data.

In one example, a method for modeling information from a data source includes comparing, with one or more computing devices, a data item heading from the data source with concept keywords in a concept library, the concept library comprising a plurality of concepts and one or more of the concept keywords in at least one language associated with each of one or more of the concepts. The method further includes identifying, with one or more computing devices, one or more matches between the data item heading and one or more concept keywords associated with a particular concept from among the concepts comprised in the concept library. The method further includes identifying, with one or more computing devices, the data item heading as being associated with the particular concept.

In another example, a computer system for modeling information from a data source includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to compare a data item heading from the data source with concept keywords in a concept library, the concept library comprising a plurality of concepts and one or more of the concept keywords in at least one language associated with each of one or more of the concepts. The computer system further includes program instructions, stored on at least one of the one or more storage devices for execution by at least one of the one or more processors via at least one of the one or more memories, to identify one or more matches between the data item heading and one or more concept keywords associated with a particular concept from among the concepts comprised in the concept library. The computer system further includes program instructions, stored on at least one of the one or more storage devices for execution by at least one of the one or more processors via at least one of the one or more memories, to identify the data item heading as being associated with the particular concept.

In another example, a computer program product for modeling information from a data source includes a computer-readable storage medium having program code embodied therewith. The program code is executable by a computing device to compare a data item heading from the data source with concept keywords in a concept library, the concept library comprising a plurality of concepts and one or more of the concept keywords in at least one language associated with each of one or more of the concepts. The program code is further executable by a computing device to identify one or more matches between the data item heading and one or more concept keywords associated with a particular concept from among the concepts comprised in the concept library. The program code is further executable by a computing device to identify the data item heading as being associated with the particular concept.

The details of one or more embodiments of the invention are set forth in the accompanying drawings and the description below. Other features, objects, and advantages of the invention will be apparent from the description and drawings, and from the claims.

DETAILED DESCRIPTION

Various examples are disclosed herein for a concept identifier system in a business intelligence system for automatic data modeling of a data source. In various examples, a concept identifier tool may automatically provide modeling of a data source by matching concepts from a concept library with data item headings in the data source.

Figure 1:
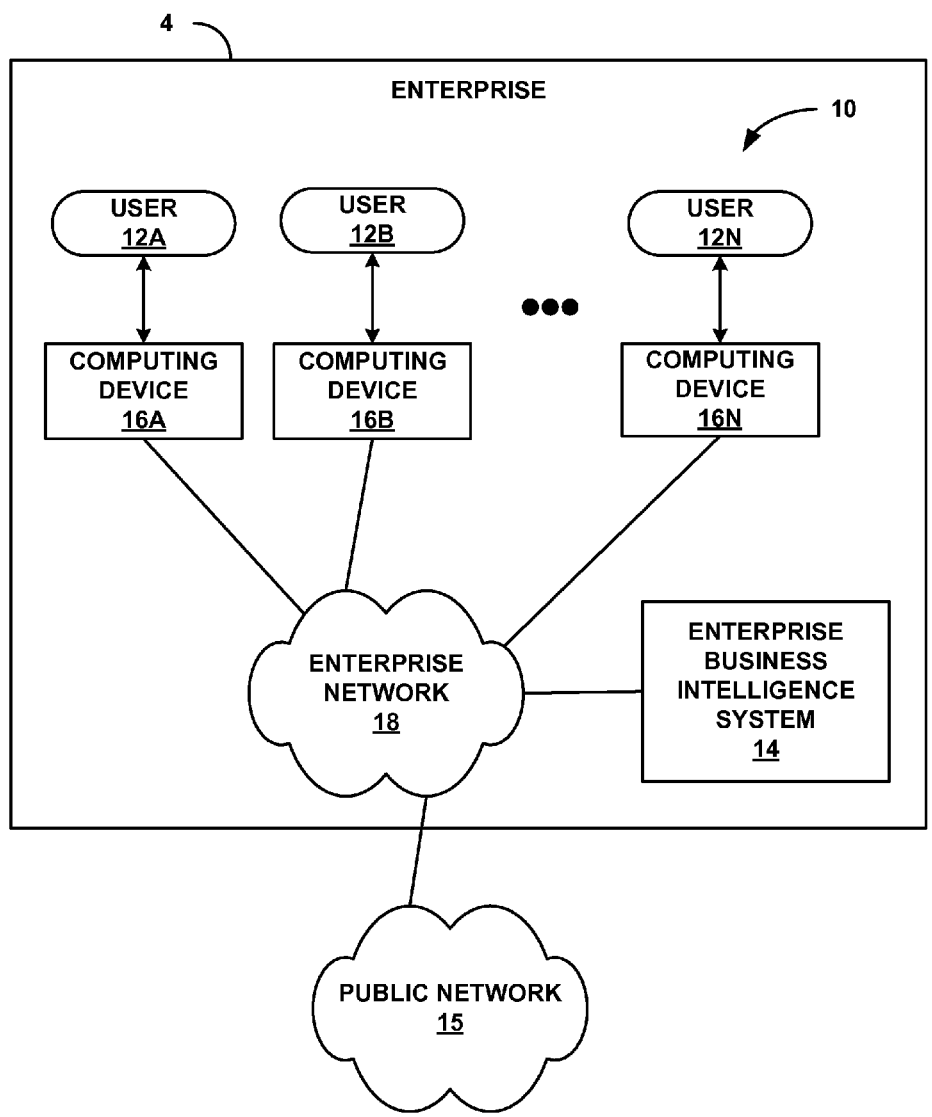
FIG. 1 is a block diagram illustrating an example enterprise having a computing environment in which users interact with an enterprise business intelligence system and data sources accessible over a public network.

FIG. 1 illustrates an example context in which a system of this disclosure may be used. FIG. 1 is a block diagram illustrating an example enterprise 4 having a computing environment 10 in which a plurality of users 12A-12N (collectively, "users 12") may interact with an enterprise business intelligence (BI) system 14. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15.

Users 12 may use a variety of different types of computing devices 16 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in either a web browser or a dedicated mobile application for interacting with enterprise business intelligence system 14.

Enterprise network 18 and public network 15 may represent any communication network, such as a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

Figure 2:
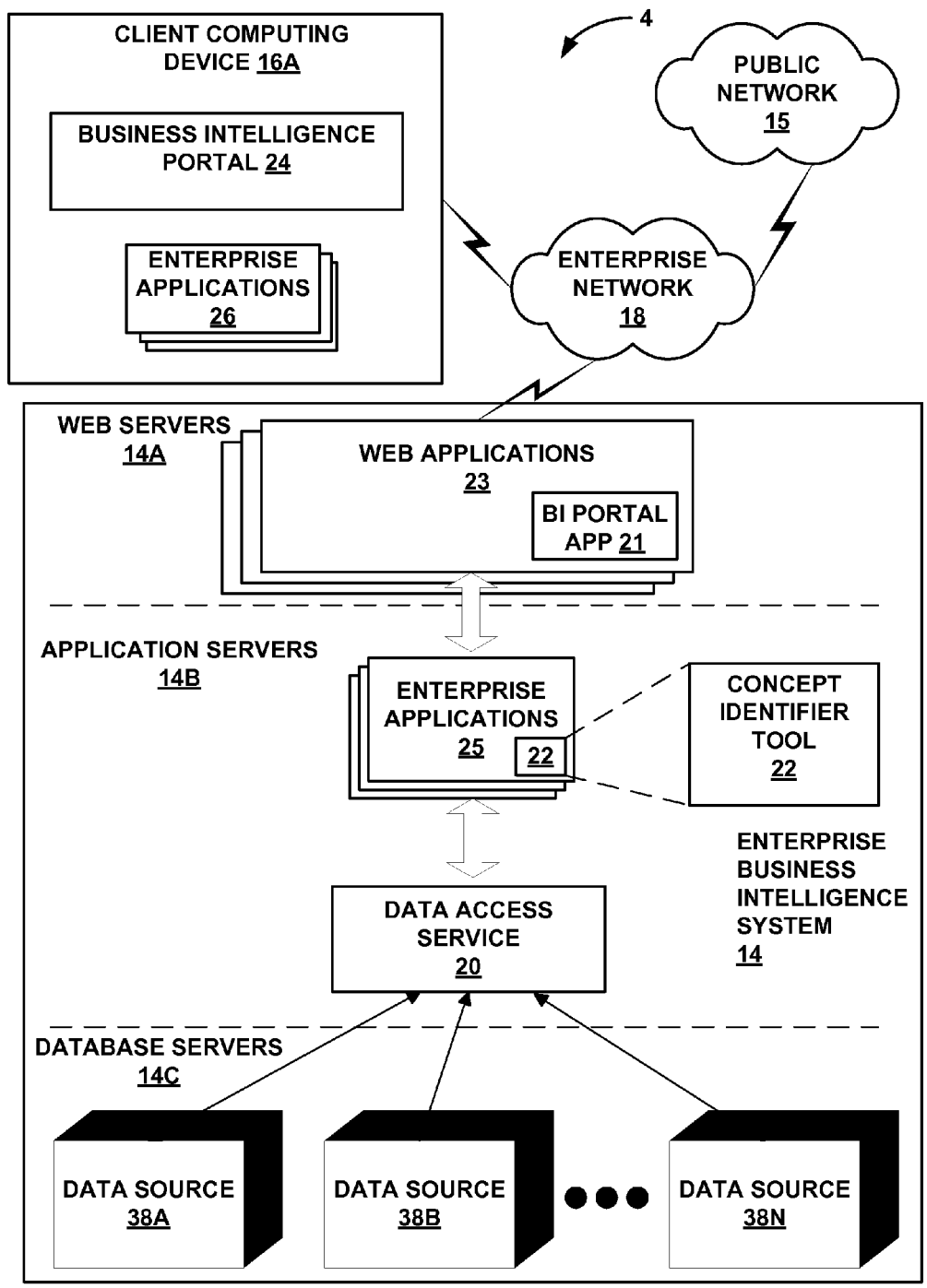
FIG. 2 is a block diagram illustrating one embodiment of an enterprise business intelligence system with a client computing device running a business intelligence dashboard with a concept identification system.

FIG. 2 is a block diagram illustrating in further detail portions of one embodiment of an enterprise business intelligence (BI) system 14. In this example implementation, a single client computing device 16A is shown for purposes of example and includes a BI portal 24 and one or more client-side enterprise software applications 26 that may utilize and manipulate multidimensional data, including to view data visualizations and analytical tools with BI portal 24. BI portal 24 may be rendered within a general web browser application, within a locally hosted application or mobile application, or other user interface. BI portal 24 may be generated or rendered using any combination of application software and data local to the computing device it's being generated on, and remotely hosted in one or more application servers or other remote resources.

BI portal 24 may output data visualizations for a user to view and manipulate in accordance with various techniques described in further detail below. BI portal 24 may present data in the form of charts or graphs that a user may manipulate, for example. BI portal 24 may present visualizations of data based on data from sources such as a BI report, e.g., that may be generated with enterprise business intelligence system 14, or another BI dashboard, as well as other types of data sourced from external resources through public network 15. BI portal 24 may present visualizations of data based on data that may be sourced from within or external to the enterprise.

FIG. 2 depicts additional detail for enterprise business intelligence system 14 and how it may be accessed via interaction with a BI portal 24 for depicting and providing visualizations of business data. BI portal 24 may provide visualizations of data that represents, provides data from, or links to any of a variety of types of resource, such as a BI report, a software application, a database, a spreadsheet, a data structure, a flat file, Extensible Markup Language ("XML") data, a data stream, unorganized text or data, or other type of file or resource. BI portal 24 may also provide visualizations of data based on data modeling information generated by a concept identifier tool 22. Concept identifier tool 22 may be hosted among enterprise applications 25, as in the example depicted in FIG. 2, or may be hosted elsewhere, including on a client computing device 16A, or distributed among various computing resources in enterprise business intelligence system 14, in some examples.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include concept identifier tool 22 as one of enterprise software applications 25 or as a portion or portions of one or more of enterprise software applications 25. The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for Online Analytical Processing (OLAP). As another example, the data sources 38 may be multidimensional databases configured to receive and execute Multidimensional Expression (MDX) queries of some arbitrary level of complexity. As yet another example, the data sources 38 may be two-dimensional relational databases configured to receive and execute SQL queries, also with an arbitrary level of complexity.

Multidimensional data structures are "multidimensional" in that each multidimensional data element is defined by a plurality of different object types, where each object is associated with a different dimension. The enterprise applications 26 on computing device 16A may issue business queries to enterprise business intelligence system 14 to build reports. Enterprise business intelligence system 14 includes a data access service 20 that provides a logical interface to the data sources 38. Client computing device 16A may transmit query requests through enterprise network 18 to data access service 20. Data access service 20 may, for example, execute on the application servers intermediate to the enterprise software applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that are made accessible to BI portal 24 on client computing device 16A. These may include concept identification information generated by concept identifier tool 22.

Concept identifier tool 22 may provide data modeling for a multidimensional data structure, a database, a spreadsheet, a CSV file, or other data source. Concept identifier tool 22 may provide automatic data modeling of a data source by matching data item headings in a data source to concepts in a concept library. Data item headings may be column headings, row headings, sheet names, graph captions, file names, document titles, or other forms of headings for lists, categories, time-ordered variables, or other forms of data items from a data source, for example. Concept identifier tool 22 may also use the matching of data item headings to concepts in automatically generating data visualizations appropriate to the data associated with the data item headings, such as trend analysis graphs for time-ordered data or charts organized by entity names, for example, as further described below.

A business intelligence system comprising concept identifier tool 22 may provide insights into a user's data that may be more targeted and more useful, and may automatically describe the nature of the data based on concepts in a concept library, rather than requiring manual data modeling.

For example, a BI system incorporating concept identifier tool 22 may identify that a set of data from a data source pertains to how one or more values vary over time, and the BI system may output the set of data in an interface mode that is ordered by time, such as a trend analysis graph or a calendar, for example. A BI system incorporating concept identifier tool 22 may also model data from unmodeled sources, such as spreadsheets or CSV files, and data in multiple languages. For example, many data sources from Asian locales contain data in both an Asian language and English, and a BI system incorporating concept identifier tool 22 may apply techniques in multiple languages in modeling the data.

Concept identifier tool 22 may therefore provide more intelligent modeling and organization of data. Concept identifier tool 22 may identify data item headings with concepts defining what the data is related to, from data in either a modeled data source or an unmodeled data source (e.g., a spreadsheet or CSV file). For example, concept identifier tool 22 may identify a data item heading, such as the title of a column in a spreadsheet, as being associated with a particular concept of time. Concept identifier tool 22 may output this identification of the data item heading with this particular concept to a consuming system, such as a BI interface, which may use this identification to extrapolate that it can generate a time-based data visualization, such as a trend analysis graph, with the data in the spreadsheet column.

Concept identifier tool 22 may make use of externalized concept libraries in multiple languages. Each particular concept in the concept library may be marked with sets of concept keywords relating to that particular concept commonly found in each of the multiple languages. When concept identifier tool 22 loads or analyzes data from a data source, concept identifier tool 22 may analyze a subset of the data and identify matches between portions of the data, such as data item headings, and the concept keywords in the multiple languages. Concept identifier tool 22 may then identify a particular concept or concepts from the concept library that provide the best match with a particular data item heading, and identify the data item heading as being associated with that particular concept or those particular concepts. Concept identifier tool 22 may identify a particular concept as providing a best match with a particular data item heading in any of various ways, such as if the concept keywords for that particular concept provides the highest number of matches with the data item heading of any concept in the concept library, or if the concept keywords for that particular concept provide a number of matches with the data item heading above a selected threshold, for example.

Therefore, concept identifier tool 22 may automatically model information from a data source. Concept identifier tool 22 may compare a data item heading from the data source with concept keywords in a concept library, the concept library comprising a plurality of concepts and one or more of the concept keywords in at least one language associated with each of the concepts. Concept identifier tool 22 may identify one or more matches between the data item heading and one or more concept keywords associated with a particular concept from among the concepts comprised in the concept library. Concept identifier tool 22 may identify the data item heading as being associated with the particular concept. By doing so, concept identifier tool 22 may provide a heuristic approach that may often correctly model and describe a data set for a consuming BI application. Concept identifier tool 22 may thereby provide insight into the data without the need for manual modeling, and quickly provide targeted insights into the data.

In one example, concept identifier tool 22 may include a single hierarchy of concepts organized as a business ontology, and a series of language-specific lexical clues that may be used commonly in each of several languages to signify business concepts. As simple examples of concepts, the concept "caption" may be listed as a first-level concept. A first-level concept may be intended to apply to a broad, generic concept that may have a broad range of more specific types. For example, the concept "caption" may incorporate a wide range of types of names, labels, and other identifiers. The concept "caption" may include, or be extended by, one or more special cases of concepts that may be considered narrower or second-level concepts within the broader, first-level concept of "caption." As a particular example, the concept "caption" may be extended by the concept "first name" as a special case of the "caption" concept.

In one implementation, each concept may be encoded as an attribute with a name that begins with a lower case "c" (for concept) followed by a string (e.g., in camel case) based on one or more English words (in this example) for the concept, e.g., "cCaption" for the "caption" concept, "cFirstName" for the "first name" special case concept within the "caption" concept, and so forth, as in the following two examples:

```
<attribute name="cCaption">
    <dataHints>
        <pattern>String</pattern>
    </dataHints>
</attribute>
``` and

```
<attribute name="cFirstName">
    <extends>cCaption</extends>
</attribute>
```

To recognize and identify these concepts in a collection of data, concept identifier tool 22 may identify clues such as lexical clues in column headings, for example. Concept identifier tool 22 may use lexical clues specific to each of one or more particular natural languages. A few illustrative examples of particular strings, specific to the English language, that concept identifier tool 22 may identify as clues, or concept keywords, signifying the concept of "caption," are as follows:

```
<conceptSignifier conceptName="cCaption">
    <label>
        <clue>caption</clue>
        <clue>name</clue>
        <clue>title</clue>
        <clue>label</clue>
    </label>
</conceptSignifier>
```

Concept identifier tool 22 may therefore list strings such as "caption," "name," "title," and "label" as concept keywords associated with the concept of "caption." Concept identifier tool 22 may also evaluate data to identify combinations of words that it may identify as concept clues when they appear in conjunction, such as the words "first" and "name." A combination of words (e.g., "first name" or "given name") may be used as clues or concept keywords for a "first name," as in the following example:

```
<conceptSignifier conceptName="cFirstName">
    <combination>
        <label>
            <clue>first </clue>
            <clue>given</clue>
        </label>
        <label>
            <clue>name</clue>
        </label>
    </combination>
</conceptSignifier>
```

Concept identifier tool 22 may therefore identify either the word "first" or the word "given" in conjunction with the word "name" to identify a match with the concept of "first name." Concept identifier tool 22 may also use lexical clues specific to other natural languages. Identifying concept clues in each particular natural language may be affected by differences specific to that language. For example, concept identifier tool 22 may use lexical clues specific to French for a data set with French language content, including French language data item headings. As an example of concept identifier tool 22 using lexical clues specific to idiosyncrasies of a particular language, in French, there exists a single word, "prénom," that means "first name," that concept identifier tool 22 may register as a concept clue or concept keyword, in one example:

```
<conceptSignifier conceptName="cFirstName">
    <label>
        <clue>prenom</clue>
    </label>
</conceptSignifier>
```

Concept identifier tool 22 may use this single word in French as a concept clue or concept keyword that may enable identifying many or almost all occurrences of a "first name" concept in data item headings in a French language data source. This may make it simpler for concept identifier tool 22 to search for clues to identify the concept of a "first name" in data item headings in French language data simpler than in analogous English language data, in which multiple groups of multiple words may need to be listed as concept clues and searched for among data headings to achieve the same result. This is one illustrative example of many instances in which inherent differences in natural languages may translate into changes in the nature and complexity of identifying concept clues in data headings among collections of data in the particular languages.

Figure 3:
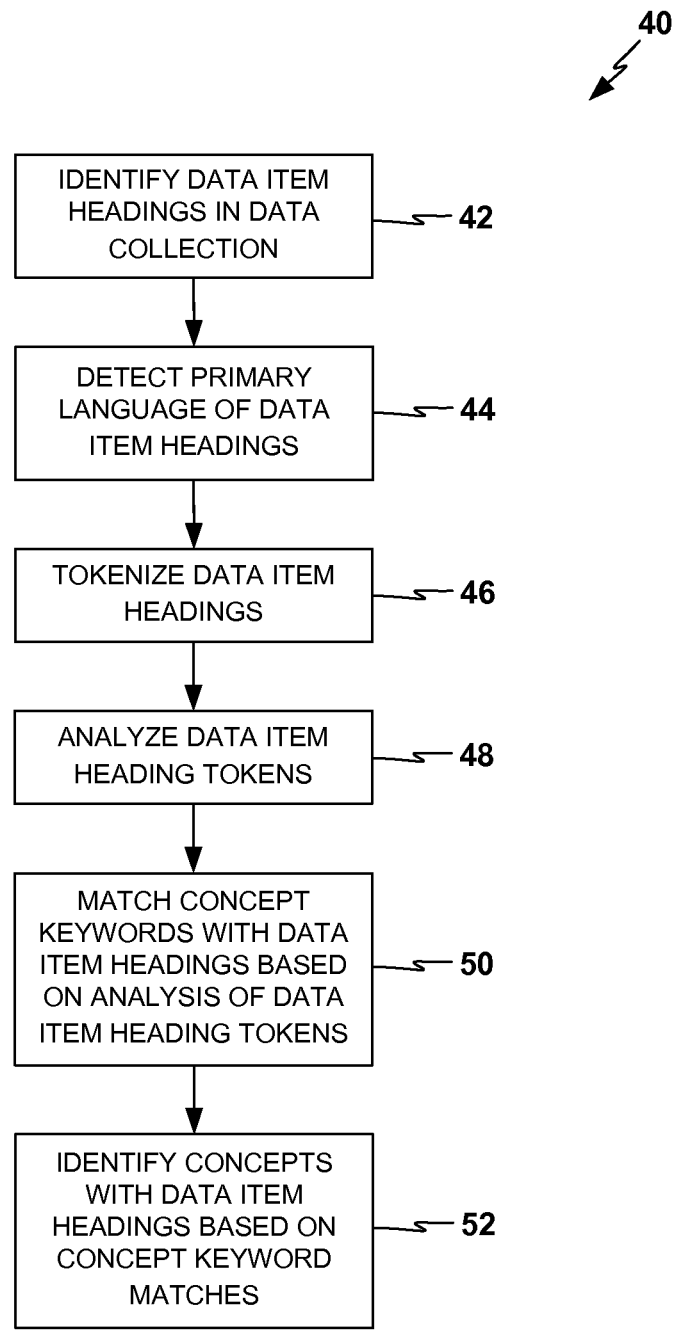
FIG. 3 depicts a process for matching concepts with data item headings that may be performed by a concept identifier tool in a business intelligence (BI) system.

FIG. 3 depicts an overview of one example of an overall process 40 that concept identifier tool 22 may perform to identify data item headings as being associated with particular concepts. In this example, concept identifier tool 22 may identify data item headings in a data collection (42), such as column headings in a database table or a spreadsheet, for example. Concept identifier tool 22 may detect or identify a primary language of the data item headings in the data source (44), and may select a lexical set based on the detected primary language. Concept identifier tool 22 may then tokenize the data item headings (46), analyze the data item heading tokens (48), and match concept keywords with the data item headings based on the analysis of the data item heading tokens (50). Tokenizing the data item headings (46) and analyzing the data item heading tokens (48) may involve various techniques described in further detail below, and for example may be done in a way specific to the identified primary language.

Matching the concept keywords with the data item headings based on the analysis of the data item heading tokens (50) may include using a resulting set of clues from the analysis of the data item heading tokens to look up one or more concepts in the concept library, based on a business ontology, as potential candidates to explain the data item headings. Matching the concept keywords with the data item headings based on the analysis of the data item heading tokens (50) may also include concept identifier tool 22 validating potential matches between concepts and data item headings using other clues, such as data patterns, the actual values of data listed under the data item heading, surrounding context of the data, and other factors. Concept identifier tool 22 may conclude by identifying one or more concepts with each of the one or more data item headings it evaluates based on the concept keyword matches (52).

In identifying the data item headings (42), the data item headings may not necessarily follow proper linguistic guidelines, and often may not be proper words. For example, strings such as "Employee_Num," "AccountCode," and "ACCOUNTCODE" may be found as column headings in typical data sources included in an enterprise data collection and analyzed by concept identifier tool 22. Moreover, in some cases, the context of data source headings involves a mixture of languages or is influenced by multiple language backgrounds. For example, many English naming conventions have found their way into other languages, such as the mixed English and Mandarin Chinese usage of "ID 番号" to represent "ID number" or "ID designation." For reasons such as these, concept identifier tool 22 may use a token-based approach to search for and identify lexical clues to concepts in data item headings. In the example of FIG. 3, concept identifier tool 22 may detect or identify a primary language of the data item headings in the data source (44), and tokenize the data item headings (46), and then analyze the data item heading tokens (48).

Concept identifier tool 22 may tokenize an input string comprising a data item heading (46) to detect its building blocks. As examples, analyzing the data item heading "Expense_CD" may result in identifying two tokens, "expense" and "cd," and analyzing the data item heading "AIRPORTNAME" may result in identifying two tokens or two clues, "airport" and "name."

In some examples, concept identifier tool 22 uses the identified primary language (44) to assist with tokenizing the data item headings (46). In some contexts, a token-based approach by itself still faces significant challenges in use for identifying concepts associated with data item headings. For example, many Asian languages do not have readily apparent word boundaries between characters, which may pose difficulty for a basic implementation of identifying concepts based on tokens. As a particular example, "空港名" is Japanese for "Airport Name", where the three characters appear without separation among them, though the first two characters form a single word for "Airport" and the third character forms a separate word for "Name." The individual word for "Name" in isolation may be identified as matching the concept of "caption," but a tokenizer by itself may not be able to recognize the character for the word for "Name" within an undifferentiated set of characters.

Concept identifier tool 22 may identify the primary language of the data source or the data item headings (44) first, and then use one or more additional tools specialized for separating or isolating individual words composed of single or multiple characters out from particular Asian language texts. Concept identifier tool 22 may thus isolate and identify words of one character or multiple characters from a text with strings of undifferentiated characters, such as isolating and identifying the character for the word "name," that are identifiable with particular concepts such as "caption." As one example, Concept identifier tool 22 may apply a tokenizer that, in some examples, may use a trie (a digital tree data structure) for tokenizing words in data sources in at least some languages, including Asian language data sources.

Comparing the data item heading with the concept keywords in the concept library may therefore include identifying a primary language of the data item heading, wherein the one or more of the concept keywords in the at least one language comprise one or more concept keywords in the primary language; and comparing the data item heading with the one or more concept keywords in the primary language. Comparing the data item heading with the concept keywords in the concept library may thus include identifying one or more tokens based on the data item heading; and comparing the one or more tokens based on the data item heading with the one or more concept keywords in the concept library. Identifying the tokens based on the data item heading may include applying a trie-based tokenizer to the data item heading.

Figure 4:
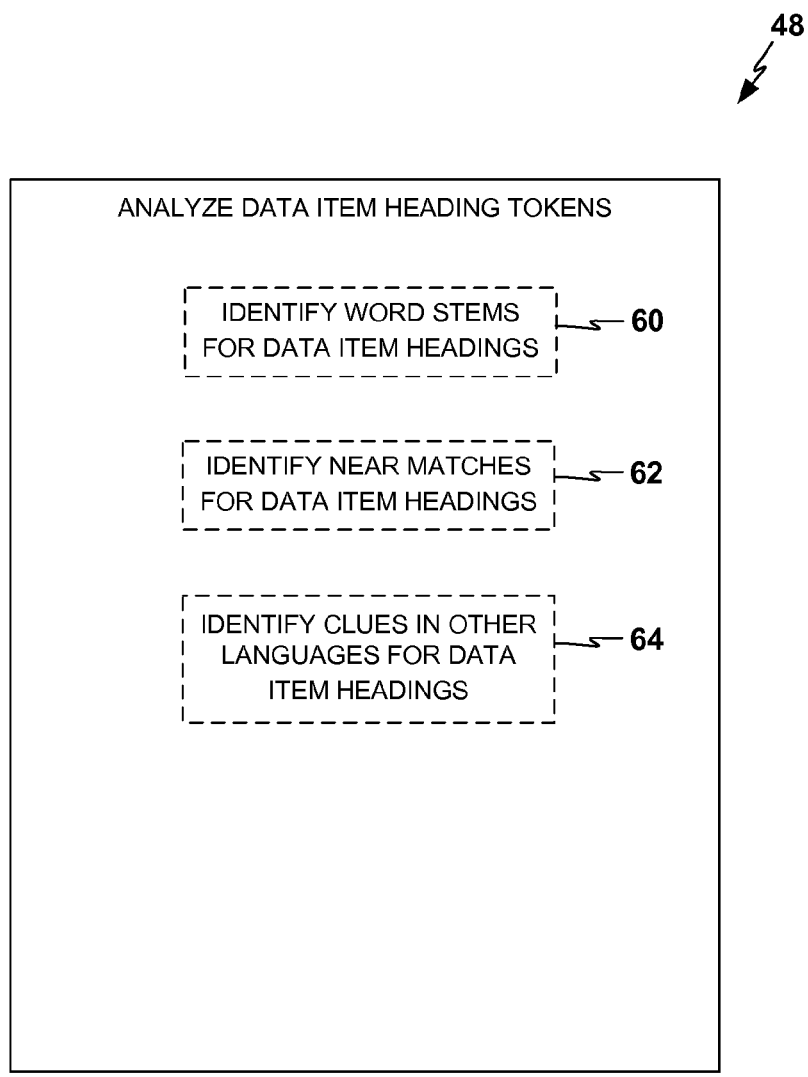
FIG. 4 depicts details of portions of a process that may be performed by a concept identifier tool in a business intelligence (BI) system.

FIG. 4 shows illustrative examples of techniques for analyzing data item heading tokens (48, as in the example of FIG. 3) that concept identifier tool 22 may use for tokens that are not recognized on an initial comparison with clues in the primary language. For example, concept identifier tool 22 may identify word stems for data item headings (60), identify near matches for data item headings (62), and/or identify clues in other languages for data item headings (64). As an example of identifying word stems (60), concept identifier tool 22 may evaluate a data item heading "Quarters" and identify the word stem as "Quarter," which may be a match to a specific English-language concept keyword for a time-based concept. Besides this simple English-language example, concept identifier tool 22 may perform similar word stemming of data item headings in any of various other languages. Comparing the data item heading with the concept keywords in the concept library may therefore include identifying one or more alternate strings based on a word stem of the data item heading; and comparing the one or more alternate strings based on the word stem of the data item heading with the one or more concept keywords in the concept library.

In identifying near matches for data item headings (62), concept identifier tool 22 may apply various near-matching algorithms, such as searching for strings that omit vowels from standard spellings, strings that match phonetic pronunciations of words, etc., to try to account for a token that concept identifier tool 22 has not yet been able to match with a concept keyword. Comparing the data item heading with the concept keywords in the concept library may therefore include identifying one or more near matches of the data item heading; and comparing the one or more near matches of the data item heading with the one or more concept keywords in the concept library. In identifying clues in other languages for data item headings (64), if concept identifier tool 22 cannot find a match for a data item heading with a concept keyword in the primary language, concept identifier tool 22 may look up potential matches for the data item heading among concept libraries or concept keywords in languages other than the primary language of the data item heading (or the data source overall).

As a particular example of concept identifier tool 22 identifying clues in other languages for data item headings (64), English language usage may be particularly widespread in business data in data sources that use languages other than English as their primary language, and if the primary language of the data item heading (or data source overall) is not English, concept identifier tool 22 may look up an unknown token in an English language clue set or concept library. As other examples, concept identifier tool 22 may look up unknown tokens in a concept library in French, German, or another language with prominent international business usage that is not the primary language of the data source. Concept identifier tool 22 may automatically identify the language of content not in the primary language of the data source, and perform a look-up in a concept library or among concept keywords in the automatically identified language. Comparing the data item heading with the concept keywords in the concept library may therefore include identifying one or more alternate language clues associated with the data item heading, wherein the one or more alternate language clues comprise content in one or more alternate languages besides a primary language of the data item heading; and comparing the one or more alternate language clues associated with the data item heading with the one or more concept keywords in the concept library. For example, the primary language may be a language other than English, and the one or more alternate languages may include English.

Finally, concept identifier tool 22 may use the resulting set of clues from tokenizing the data item headings (46) and analyzing the data item heading tokens (48) to match concept keywords with the data item headings (50). Concept identifier tool 22 may look up concept keywords associated with one or more concepts in a concept library, that represents or is based on a business ontology, as potential candidates to explain the data item heading.

Concept identifier tool 22 may further validate likely candidate concepts as matches with data item headings using other clues, such as data patterns, the actual values of data listed under the data item heading, surrounding context of the data, and other factors. For example, when looking up candidate concepts for a given set of clues or potential matches, concept identifier tool 22 may assign priority to concepts that are signified by a greater number of matches between their concept keywords and the data item heading. For example, given a data item heading or title such as "AIRPORTNAME," concept identifier tool 22 may initially identify the concept "caption" as a potential match with the data item heading, based on a match with the concept keyword of "name" associated with the concept "caption," pending further validation.

However, during the validating process, concept identifier tool 22 may identify a separate concept, "AirportName," in the applicable concept library, that has concept keywords of "airport" and "name" that match the combination of two clues or data item heading tokens, "airport" and "name," from the data item heading. Some concept libraries may not have a general concept of "AirportName" separate from the concept of "caption," but this may be different in the case of a particular concept library tailored to a particular business ontology of a particular business in which airport names are of special significance. In this case, since concept identifier tool 22 identifies multiple concept keywords of a single concept in the concept library that match multiple data item heading tokens of the data item heading, concept identifier tool 22 may select the concept "AirportName" instead of the concept "caption" as its final selection to identify a particular concept with the data item heading (52).

Identifying the one or more matches between the data item heading and the one or more concept keywords associated with the particular concept may therefore include validating the one or more matches between the data item heading and the one or more concept keywords associated with the particular concept against additional evidence from the data source. In one example, the data item heading is a first data item heading, and the additional evidence from the data source may include one or more of: values of data associated with the first data item heading, patterns of data associated with the first data item heading, and additional data item headings comparable to the first data item heading.

Once concept identifier tool 22 makes its final identification of a concept with a data item heading (52), concept identifier tool 22 may apply a concept tag in association with the data item heading. The concept tag may indicate the particular concept with which the data item heading is identified as being associated. Concept identifier tool 22 may output the concept tag in association with the data item heading to other systems, such as part of the output of a BI system to a consuming application such as a BI dashboard or other BI user interface. In some examples, concept identifier tool 22 may use the identification of the concept with the data item heading (52) to identify a data analytics interface output mode that corresponds to the particular concept and output the data analytics interface output mode identified as corresponding to the particular concept. For example, concept identifier tool 22 may identify a time-ordered graph displaying a data visualization of the data under the data item heading as it varies over time, as a data analytics interface output mode that corresponds to the particular concept of "time" that is identified as associated with the data item heading. In other examples, a consuming application, such as a BI dashboard, may use concept tags or other information it receives from concept identifier tool 22 to determine such an appropriate data analytics interface output mode identified as corresponding to the particular concept.

Therefore, in an example in which the particular concept is identified as being or including time, the data analytics interface output mode identified by concept identifier tool 22 as corresponding to the particular concept may include a data visualization of one or more variables in relation to time. In another example, the particular concept is identified as being or including a name or names, and the data analytics interface output mode identified by concept identifier tool 22 as corresponding to the particular concept may include a data visualization of one or more variables in relation to entries corresponding to the names. The variables may be any type of data found in a data source, and may include time-ordered sets of data that vary relative to categories such as time, geography, business division, product line, and so forth. Examples of such variables may include sales, revenue, profits, margins, expenses, customer or user count, stock trading volume, stock share price, interest rates, or any other value of interest.

Figure 5:
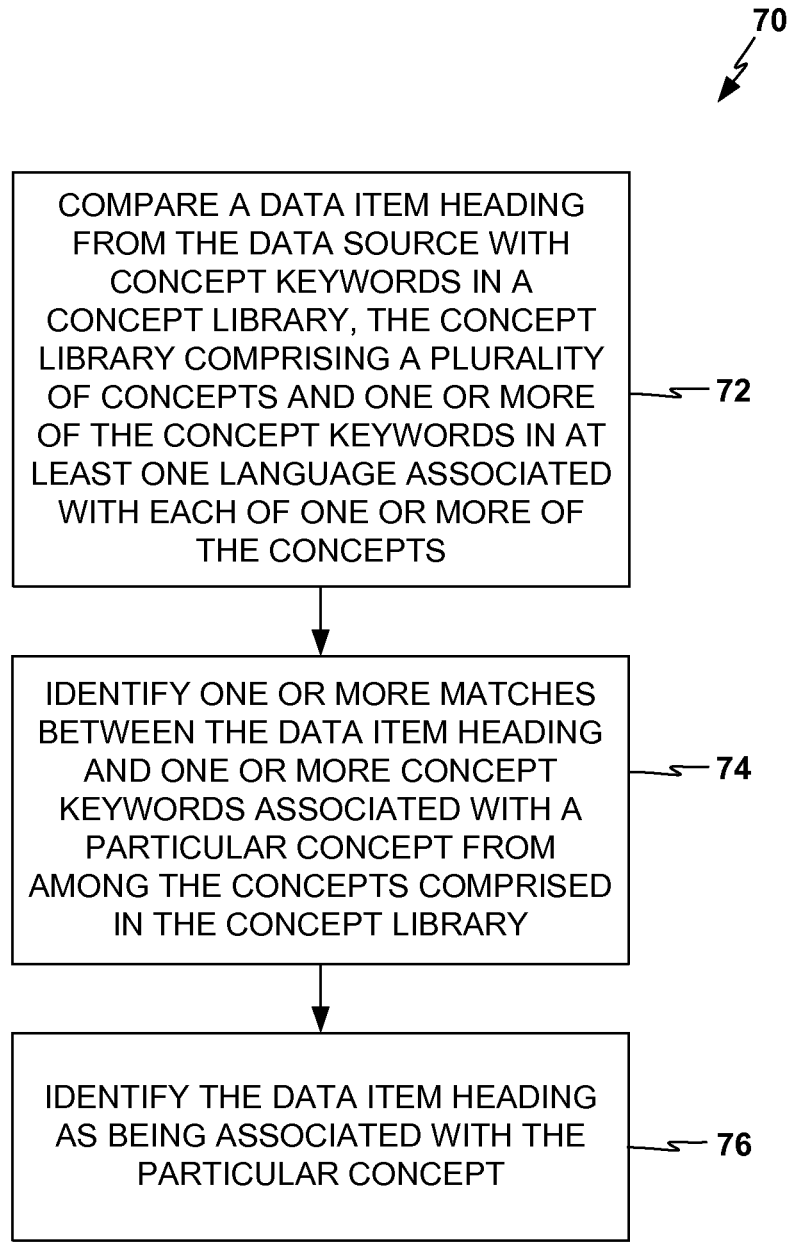
FIG. 5 depicts a process for matching concepts with data item headings that may be performed by a concept identifier tool in a business intelligence (BI) system.

FIG. 5 shows a flowchart for an example overall process 70 that concept identifier tool 22, executing on one or more computing devices, may perform. Concept identifier tool 22 may compare a data item heading from the data source with concept keywords in a concept library, the concept library comprising a plurality of concepts and one or more of the concept keywords in at least one language associated with each of the concepts (72). In various examples, this may include (or in some examples, be preceded by) identifying data item headings in a data collection (42), identifying a primary language of the data item headings in the data source (44), tokenizing the data item headings (46), and analyzing the data item heading tokens (48). In some examples, this may also include identifying word stems for data item headings (60), identifying near matches for data item headings (62), and/or identifying clues in other languages for data item headings (64). Concept identifier tool 22 may identify one or more matches between the data item heading and one or more concept keywords associated with a particular concept from among the concepts comprised in the concept library (74). This may include matching concept keywords with the data item headings based on the analysis of the data item heading tokens (50). Concept identifier tool 22 may identify the data item heading as being associated with the particular concept (76). This may include identifying one or more concepts with each of the one or more data item headings it evaluates based on the concept keyword matches (52), and may include making a final determination of the association of the data item heading with the particular concept, potentially after a validation process or after determining that the evidence for a match has fulfilled a threshold for matching criteria.

Figure 6:
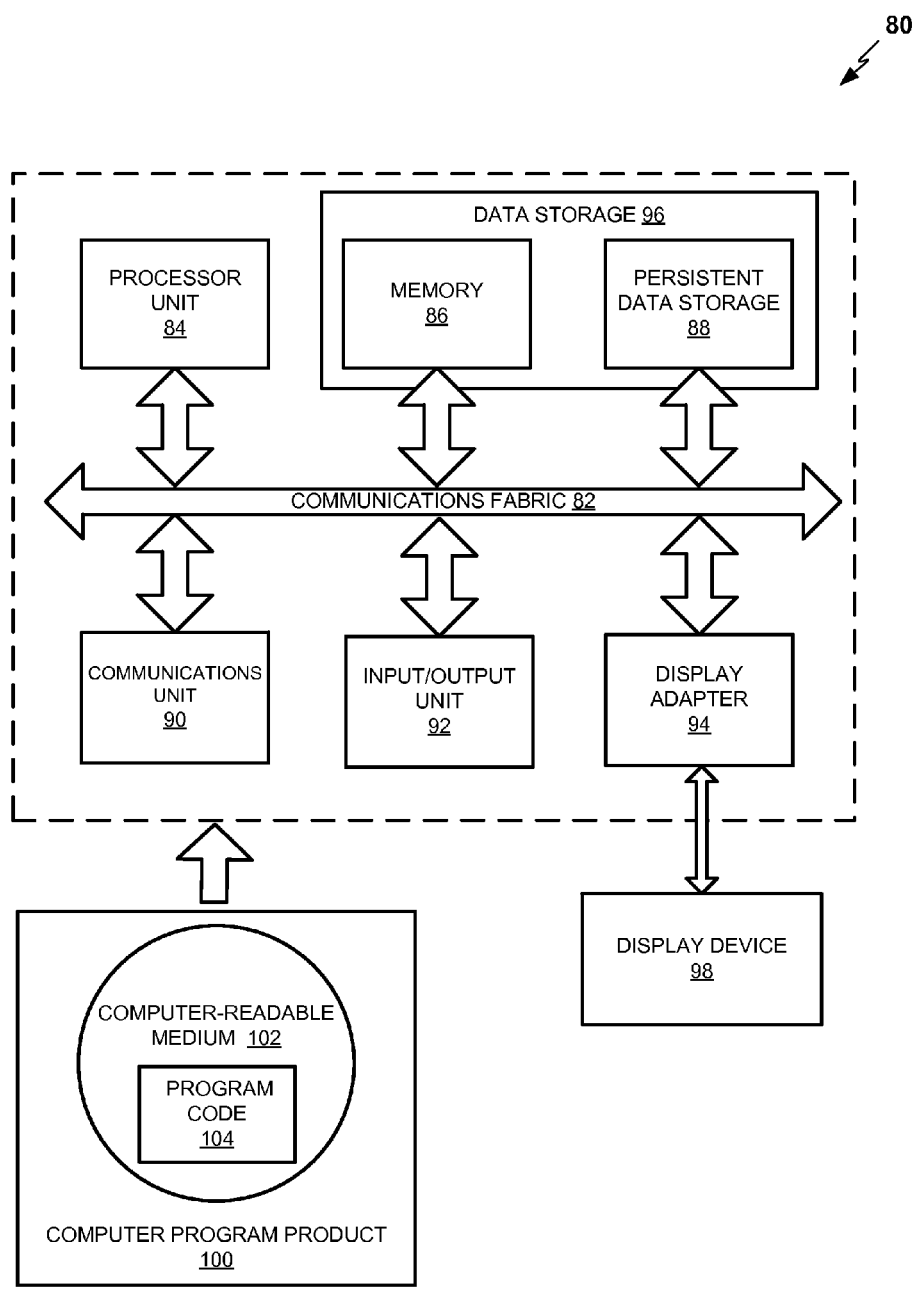
FIG. 6 is a block diagram of a computing device that may execute a concept identification system.

FIG. 6 is a block diagram of a computing device 80 that may be used to execute a concept identifier tool 22, according to an illustrative example. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 6, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data or computer program data for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a concept identifier tool 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

As will be appreciated by a person skilled in the art, aspects of the present disclosure may be embodied as a method, a device, a system, or a computer program product, for example. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible data storage medium (which may be non-transitory in some examples), as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wire line, optical fiber cable, etc., or any suitable combination of the foregoing. Computer program code for carrying out operations for aspects of the present invention may be written in any combination of one or more programming languages, including an object oriented programming language such as Java, Smalltalk, C++, or the like, or other imperative programming languages such as C, or functional languages such as Common Lisp, Haskell, or Clojure, or multi-paradigm languages such as C#, Python, or Ruby, among a variety of illustrative examples. One or more sets of applicable program code may execute partly or entirely on the user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures. A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Aspects of the present invention are described herein with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer-implemented process such that the instructions that execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may be executed in a different order, or the functions in different blocks may be processed in different but parallel processing threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of executable instructions, special purpose hardware, and general-purpose processing hardware.

The description of the present disclosure has been presented for purposes of illustration and description, and is not intended to be exhaustive or limited to the disclosure in the form disclosed. Many modifications and variations will be understood by persons of ordinary skill in the art based on the concepts disclosed herein. The particular examples described were chosen and disclosed in order to explain the principles of the disclosure and example practical applications, and to enable others of ordinary skill in the art to understand the disclosure for various embodiments with various modifications as are suited to the particular use contemplated. The various examples described herein and other embodiments are within the scope of the following claims.

What is claimed is:

1. A method for data modeling comprising:
   comparing, with one or more processors of a computing system configured to perform data modeling, a data item heading from a data source with concept keywords in a concept library, wherein the data item heading is associated with a set of data items in the data source, and the concept library comprising a plurality of concepts and one or more of the concept keywords in at least one language associated with each of one or more of the concepts, wherein the concept library is tailored to a particular business ontology of a particular business;
   identifying, with the one or more processors, one or more matches between the data item heading and one or more concept keywords associated with a particular concept from among the concepts comprised in the concept library;
   identifying, with the one or more processors, the data item heading as being associated with the particular concept;
   validating, with the one or more processors, the one or more matches between the data item heading and the one or more concept keywords associated with the particular concept;
   applying, with the one or more processors, a concept tag in association with the data item heading, wherein the concept tag indicates the particular concept with which the data item heading is identified as being associated; and
   outputting, with the one or more processors, for display, the concept tag in association with the data item heading to a business intelligence web application, wherein the business intelligent web application uses the concept tag to determine a data analytics interface output mode for creation of a data visualization of one or more variables in relation to entries corresponding to the particular concept,
   wherein validating the one or more matches between the data item heading and the one or more concept keywords associated with the particular concept comprises assigning priority to the particular concept based on a number of matches between the one or more concept keywords associated with the particular concept in the particular business ontology and the data item heading, and
   wherein assigning priority to the particular concept based on the number of matches between the one or more concept keywords associated with the particular concept in the particular business ontology and the data item heading comprises identifying if the one or more concept keywords associated with the particular concept provides a highest number of matches with the data item heading of any concept in the concept library.

2. The method of claim 1, wherein comparing the data item heading with the concept keywords in the concept library further comprises:
   identifying a primary language of the data item heading, wherein the one or more of the concept keywords in the at least one language comprise one or more concept keywords in the primary language; and
   comparing the data item heading with the one or more concept keywords in the primary language.

3. The method of claim 1, wherein comparing the data item heading with the concept keywords in the concept library further comprises:
   identifying one or more tokens based on the data item heading; and
   comparing the one or more tokens based on the data item heading with the one or more concept keywords in the concept library.

4. The method of claim 3, wherein identifying the one or more tokens based on the data item heading comprises applying a trie-based tokenizer to the data item heading.

5. The method of claim 1, wherein comparing the data item heading with the concept keywords in the concept library further comprises:
   identifying one or more alternate strings based on a word stem of the data item heading; and comparing the one or more alternate strings based on the word stem of the data item heading with the one or more concept keywords in the concept library.

6. The method of claim 1, wherein comparing the data item heading with the concept keywords in the concept library further comprises:
   identifying one or more near matches of the data item heading; and
   comparing the one or more near matches of the data item heading with the one or more concept keywords in the concept library.

7. The method of claim 1, wherein comparing the data item heading with the concept keywords in the concept library further comprises:
   identifying one or more alternate language clues associated with the data item heading, wherein the one or more alternate language clues comprise content in one or more alternate languages besides a primary language of the data item heading; and
   comparing the one or more alternate language clues associated with the data item heading with the one or more concept keywords in the concept library.

8. The method of claim 7, wherein the primary language is a language other than English, and the one or more alternate languages comprise English.

9. The method of claim 1, wherein identifying the one or more matches between the data item heading and the one or more concept keywords associated with the particular concept further comprises:
   validating the one or more matches between the data item heading and the one or more concept keywords associated with the particular concept against additional evidence from the data source.

10. The method of claim 9, wherein the data item heading is a first data item heading, and wherein the additional evidence from the data source comprises one or more of: values of data associated with the first data item heading, patterns of data associated with the first data item heading, and additional data item headings comparable to the first data item heading.

11. The method of claim 1, further comprising:
    identifying a data analytics interface output mode that corresponds to the particular concept; and
    outputting the data analytics interface output mode identified as corresponding to the particular concept.

12. The method of claim 11, wherein the particular concept comprises time, and the data analytics interface output mode identified as corresponding to the particular concept comprises a data visualization of one or more variables in relation to time.

13. The method of claim 11, wherein the particular concept comprises names, and the data analytics interface output mode identified as corresponding to the particular concept comprises a data visualization of one or more variables in relation to entries corresponding to the names.

14. The method of claim 1, wherein the data item heading comprises one or more of a column heading, a row heading, a sheet name, a graph caption, a file name, and a document title from the data source.

\* \* \* \* \*